United States Patent
Mogi et al.

(10) Patent No.: US 12,086,411 B2
(45) Date of Patent: Sep. 10, 2024

(54) STORAGE CONTROL APPARATUS AND METHOD FOR A DATABASE STORING DATA IN PAGES

(71) Applicant: Hitachi, Ltd., Tokyo (JP)

(72) Inventors: Kazuhiko Mogi, Tokyo (JP); Shinji Fujiwara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 21 days.

(21) Appl. No.: 17/894,196

(22) Filed: Aug. 24, 2022

(65) Prior Publication Data

US 2023/0273728 A1    Aug. 31, 2023

(30) Foreign Application Priority Data

Feb. 28, 2022    (JP) .................................. 2022-029000

(51) Int. Cl.
  *G06F 3/06*    (2006.01)
(52) U.S. Cl.
  CPC ............ *G06F 3/061* (2013.01); *G06F 3/0659* (2013.01); *G06F 3/0676* (2013.01); *G06F 3/0679* (2013.01); *G06F 3/0682* (2013.01)
(58) Field of Classification Search
  CPC ...... G06F 3/061; G06F 3/0659; G06F 3/0676; G06F 3/0679; G06F 3/0682
  See application file for complete search history.

(56) References Cited

U.S. PATENT DOCUMENTS

| | | | |
|---|---|---|---|
| 5,822,780 A | 10/1998 | Schutzman | |
| 11,087,017 B1* | 8/2021 | Mare | G06F 21/6218 |
| 2008/0228834 A1* | 9/2008 | Burchall | G06F 11/2038 |
| 2010/0011185 A1* | 1/2010 | Inoue | G06F 3/0644 |
| | | | 711/E12.001 |
| 2013/0160022 A1* | 6/2013 | Blight | G06F 9/466 |
| | | | 718/104 |
| 2022/0414015 A1* | 12/2022 | Reisteter | G06F 16/2358 |

OTHER PUBLICATIONS

C. Mohan, IBM's Relational DBMS Products: Features and Technologies; SIGMOD, 1993, pp. 445-448, May 1993.

* cited by examiner

*Primary Examiner* — Eric T Loonan
(74) *Attorney, Agent, or Firm* — MATTINGLY & MALUR, PC

(57) ABSTRACT

A database is stored in a plurality of pages that are a plurality of logical storage areas constituting a logical storage space. Data writing to a database in the logical storage space is performed in a page unit. A storage control apparatus coupled to an external storage and including a cache device writes data to the cache device in a page unit. The storage control apparatus determines whether an execution condition on external writing that is writing to the external storage is satisfied. When a result of the determination is true, the storage control apparatus writes data stored in the cache device to the external storage in a bulk unit that is larger than a page unit and is a writing unit in which consistency is maintained.

10 Claims, 13 Drawing Sheets

FIG. 4

BUFFER MANAGEMENT TABLE (114)

| BUFFER AREA ID (172) | PAGE ID (174) | STATE (176) |
|---|---|---|
| B1-1 | A38938 | clean |
| B1-2 | F28 | dirty |
| ⋮ | ⋮ | ⋮ |

FIG. 5

CACHE MANAGEMENT TABLE (124)

| CACHE LBA (178) | PAGE ID (179) | WRITE STATE (182) |
|---|---|---|
| 76A600 | A38938 | COMPLETED |
| 787900 | F28 | NOT COMPLETED |
| ⋮ | ⋮ | ⋮ |

FIG. 6

ALLOCATION RULE TABLE (116)

| PAGE SIZE (184) | SEGMENT SIZE (186) | SEGMENT GROUP SIZE (188) | OBJECT BASIC SIZE (192) |
|---|---|---|---|
| 4KB | 1024 pages | 256 segments | 4096 pages |

FIG. 13

| LOGICAL ADDRESS (242) | CACHE ADDRESS (244) | EXTERNAL STORAGE POSITION (246) | STATE (248) |
|---|---|---|---|
| Dev1:128-255 | SSD1:512-639 | Obj1:65536-131071 | Both |
| Dev1:256-383 | — | Obj1:131072-196607 | Str only |
| ⋮ | ⋮ | ⋮ | ⋮ |

STORAGE MANAGEMENT TABLE 240

FIG. 14

| DB TABLE ID (334) | SEGMENT RANGE (336) | LOGICAL ADDRESS (342) |
|---|---|---|
| Tbl1 | 1 - A3895 | Dev1:1-A3895 |
| Tbl2 | A3896-B8392 | Dev1: A3896-B8392 |
| ⋮ | ⋮ | ⋮ |

DB MAP TABLE 250

STORAGE CONTROL APPARATUS AND METHOD FOR A DATABASE STORING DATA IN PAGES

CROSS-REFERENCE TO PRIOR APPLICATION

This application relates to and claims the benefit of priority from Japanese Patent Application number 2022-029000, filed on Feb. 28, 2022 the entire disclosure of which is incorporated herein by reference.

BACKGROUND

The present invention generally relates to storage control.

In a known method for improving input/output (I/O) performance of a server (server instance) on a public cloud, a cache device built in the server is used. Since large-volume data cannot be stored in the cache device, data temporary stored in the cache device is written to an external storage of the server.

Writing target data is, for example, database data. PTL 1 discloses a technology of storing DB data in a hierarchical storage management (HSM) system using a secondary storage (magnetic disk) and a tertiary storage (such as a magnetic tape).

PATENT LITERATURE

[PTL 1] U.S. Pat. No. 5,822,780

SUMMARY

A server (exemplary storage control apparatus) may be an on-premise server in place of or in addition to a server on a public cloud. In an environment in which data is written from a cache device built-in the server to an external storage of the server, performance and cost differ based on the number of times of writing from the server to the external storage. PTL 1 fails to disclose or suggest a technology for optimizing writing while maintaining data consistency in such an environment.

A database is stored in a plurality of pages that are a plurality of logical storage areas constituting a logical storage space. Data writing to a database in the logical storage space is performed in a page unit. A storage control apparatus coupled to an external storage and including a cache device writes data to the cache device in a page unit. The storage control apparatus determines whether an execution condition on external writing that is writing to the external storage is satisfied. When a result of the determination is true, the storage control apparatus writes data stored in the cache device to the external storage in a bulk unit that is larger than a page unit and is a writing unit in which consistency is maintained.

According to the present invention, it is possible to maintain both performance and cost in an environment in which performance and cost differ based on the number of times of writing from a storage control apparatus to an external storage and a database is stored in the external storage.

BRIEF DESCRIPTION OF THE DRAWINGS

FIG. 4 illustrates the configuration of a buffer management table;

FIG. 5 illustrates the configuration of a cache management table;

FIG. 6 illustrates the configuration of an allocation rule table;

FIG. 13 illustrates the configuration of an area management table;

FIG. 14 illustrates the configuration of a DB map table;

DESCRIPTION OF EMBODIMENTS

Figure 1:
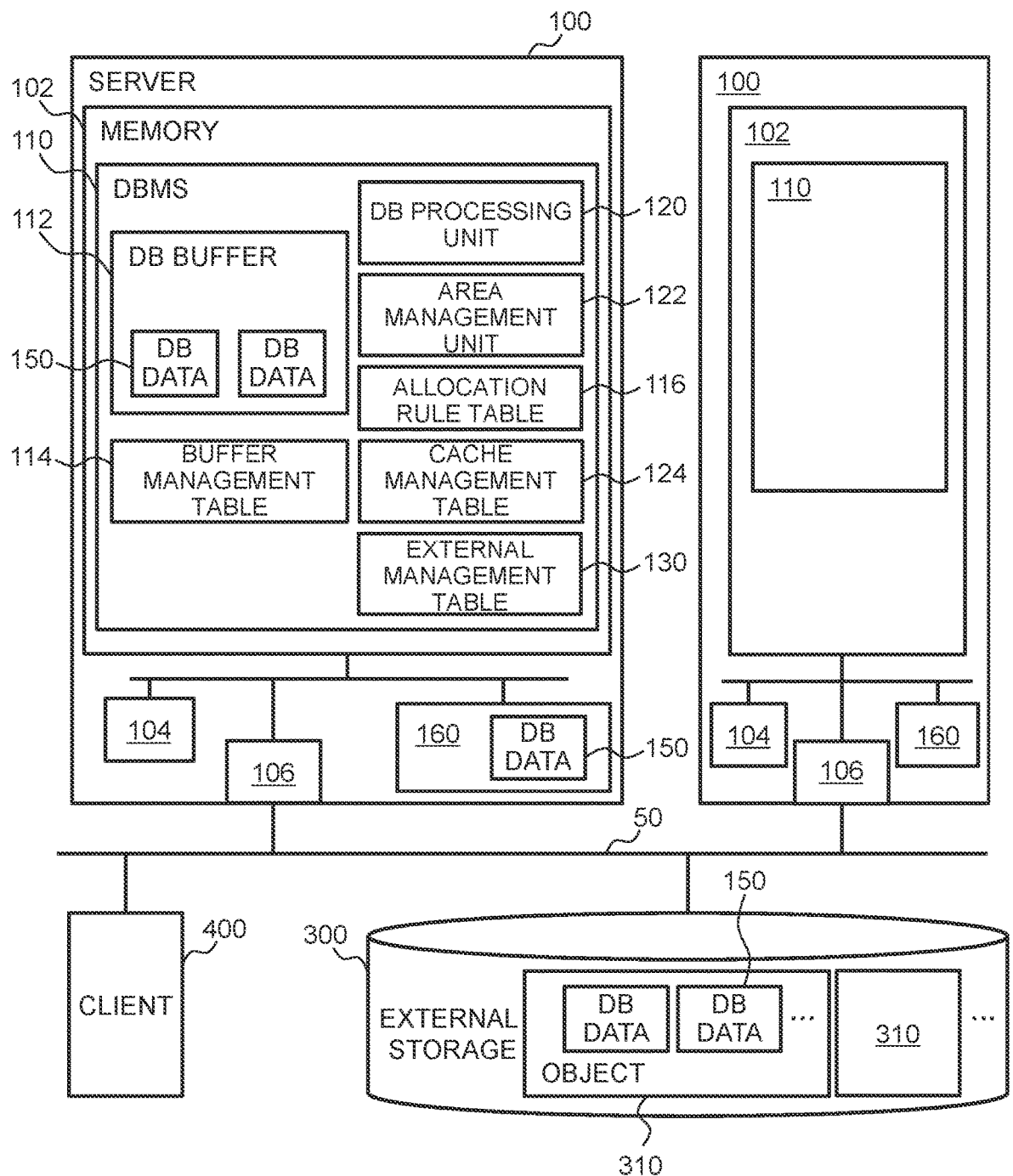
FIG. 1 illustrates the entire configuration of a system including a storage control system according to a first embodiment.

In the following description, an "interface apparatus" may be one or more communication interface devices. The one or more communication interface devices may be one or more communication interface devices (for example, one or more network interface cards (NICs)) of the same kind or may be two or more communication interface devices (for example, an NIC and a host bus adapter (HBA)) of different kinds.

In the following description, a "memory" is one or more memory devices as examples of one or more storage devices and may be typically a main storage device. At least one memory device in the memory may be a transitory memory device or a non-transitory memory device.

In the following description, a "persistent storage apparatus" may be one or more persistent storage devices as examples of one or more storage devices. Each persistent storage device may be typically a non-transitory storage device (for example, an auxiliary storage device), and specifically, may be a hard disk drive (HDD), a solid state drive (SSD), a non-volatile memory express (NVMe) drive, or the like.

In the following description, a "processor" may be one or more processor devices. Typically, at least one of the processor devices may be a microprocessor device such as a central processing unit (CPU) or may be a processor device of another kind, such as a graphics processing unit (GPU). At least one of the processor devices may be a single-core processor device or a multi-core processor device. At least one of the processor devices may be a processor core. At least one of the processor devices may be a hardware circuit (for example, a field-programmable gate array (FPGA), a complex programmable logic device (CPLD), or a general processor device such as an application specific integrated circuit (ASIC), which performs partial or entire processing.

In the following description, information from which an output can be obtained in response to an input is expressed as an "xxx table" in some cases, but the information may be data of any structure (for example, structured data or unstructured data) or may be a neural network, a genetic algorithm, or a learning model such as a random forest, which generate an output in response to an input. Thus, an "xxx table" may be referred to as "xxx information". In the following description, the configuration of each table is exemplary, and one table may be divided into two or more tables, or the entire or part of two or more tables may be one table.

In the following description, a function is described in an expression of "yyy unit" in some cases, but the function may be achieved as one or more computer programs are executed by a processor, may be achieved by one or more hardware circuits (for example, FPGA or ASIC), or may be achieved by combination thereof. When a function is achieved as a computer program are executed by a processor, determined processing is performed by using, for example, a storage apparatus and/or an interface apparatus as appropriate, and thus the function may be at least part of the processor. Processing described with a function as a subject may be processing performed by a processor or an apparatus including the processor. A computer program may be installed from a computer program source. The computer program source may be, for example, a computer program distributing calculator or a calculator-readable recording medium (for example, a non-temporary recording medium). Description of each function is exemplary, a plurality of functions may be collected as one function, and one function may be divided into a plurality of functions.

In the following description, a sign (for example, 600) common to reference signs of components of the same kind is used when the components are not distinguished from each other, but the reference signs (for example, 600a, 600b, and 600c) are used in some cases when the components are distinguished from each other.

Some embodiments will be described below. In the following description, "DB" is an abbreviation for database.

First Embodiment

FIG. 1 illustrates the entire configuration of a system including a storage control system according to a first embodiment.

A client 400, an external storage 300, and the storage control system are coupled to a communication network 50 (for example, the Internet). The storage control system is a calculator system including a database management system (DBMS) 110.

The client 400 is an exemplary transmission source of a DB operation request to the storage control system. The DB operation request may be referred to as a DB query and may be, for example, a request for Select, Update, Delete, Insert, or Import.

The external storage 300 is a storage outside the storage control system. In the present embodiment, the external storage 300 is a cloud storage (storage as a cloud computing service) on a public cloud.

The storage control system is a scale-out type calculator system including a plurality of servers 100 (node). Each server 100 is an exemplary storage control apparatus, and in the present embodiment, is an on-premise server.

In other words, a configuration in which the cloud storage is shared among the plurality of on-premise servers constituting the storage control system is employed for DB management in the present embodiment.

Each server 100 includes an interface apparatus 106, a cache device 160, a memory 102, and a processor 104 coupled thereto.

The interface apparatus 106 performs communication through the communication network 50.

The cache device 160 may be a transitory storage device, but in the present embodiment, is a persistent storage device (for example, a non-volatile memory express (NVMe) interface solid state drive (SSD)).

The memory 102 is, for example, a transitory memory (typically, a main storage memory). The memory 102 stores a software program for implementing the database management system (DBMS) 110. The DBMS 110 is implemented by the processor 104 executing the software program.

The DBMS 110 manages a DB buffer 112, an external management table 130, a buffer management table 114, a cache management table 124, and an allocation rule table 116. The DBMS 110 includes functions such as a DB processing unit 120 and an area management unit 122. These tables and functions will be described later.

A database address space (DB space) managed by the DBMS 110 is constituted by a plurality of pages. Thus, the minimum unit of data in a database is a page. In the following description, a page unit of data is referred to as "DB data". Writing to the cache device 160 is writing in a block unit having a size equal to or smaller than the page size, but since the minimum unit of writing by the DBMS 110 is a page unit (since the DBMS 110 inputs and outputs data in a page unit), DB data is written to the cache device 160. The page size may be an integral multiple of the block size.

In this manner, data input to and output from the DB buffer 112 and the cache device 160 is DB data 150, but the unit of data inputting to and outputting from the external storage 300 is an object 310. Thus, the external storage 300 as the cloud storage is an object storage in the present embodiment. The object 310 is a set of a plurality of pieces of DB data. Accordingly, the size of the object 310 is larger than the size of DB data (page). The size of the object 310 may be fixed but is variable in the present embodiment.

Figure 2:
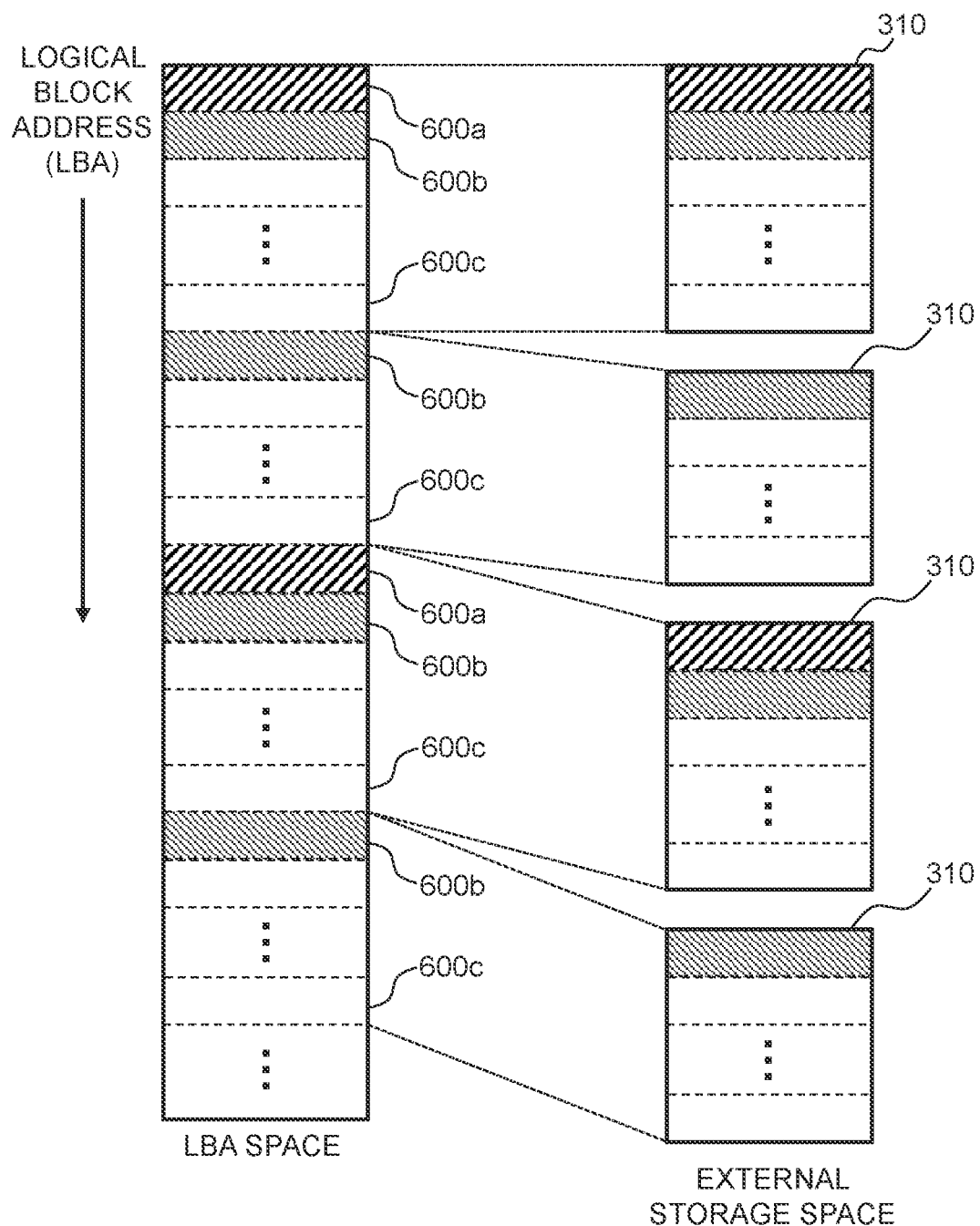
FIG. 2 illustrates the relation between an LBA space and an external storage space.

FIG. 2 illustrates the relation between a logical block address (LBA) space and an external storage space.

The LBA space is an exemplary continuous address space based on a block device inside each server 100. The LBA space is constituted by a plurality of pages 600. Each of the plurality of pages is classified into a segment. A "segment" is constituted by two or more continuous pages.

Each of a plurality of segments is classified into a segment group. A "segment group" is constituted by two or more segments (for example, two or more continuous segments).

Each segment is constituted by a plurality of data pages 600c. Each data page 600c is a page in which the DB data 150 is stored (page managed by the DBMS 110).

A page 600 is used as a page management page 600b for each segment. The page management page 600b is a page in which page management information is stored. The page management information for each segment includes, for each data page 600c in the segment, information indicating the state of the data page 600c. The state of a data page 600c is, for example, "vacancy" (the data page 600c is a vacant page) or "no vacancy" (the data page 600c is not a vacant page). The page management page 600b may or may not be included in the segment (for example, the page management page 600b may be a leading page in the segment).

Each segment group is constituted by a plurality of segments. A page 600 is used as a segment management page 600a for each segment group. The segment management page 600a is a page in which segment management information is stored. The segment management information for each segment group includes, for each segment in the segment group, information indicating the state of the segment. The state of a segment is, for example, "vacancy" (the segment includes a vacant page) or "no vacancy" (the segment includes no vacant page). Thus, allocation of pages 600 to the cache device 160 is managed in a segment unit. The segment management page 600a may or may not be included in a segment in the segment group (for example, the segment management page 600a may be a leading page in a leading segment in the segment group).

All data (including the page management information) in a plurality (or one) of segments is written as one object 310 to the external storage 300. Thus, an object 310 includes not only the page management information but also the segment management information, and another object 310 includes the page management information as necessary but does not include the segment management information. In the present embodiment, one segment group is stored as one to a plurality of objects 310 in the external storage 300.

The number of data pages 600c in a segment may be different among segments but is constant in the present embodiment. Which page 600 serves as the segment management page 600a and which page 600 serves as the page management page 600b are determined in accordance with the number of data pages 600c determined based on management information in the page 600a or 600b. In addition, which object 310 data in a page 600 is included in may be determined through calculation based on the page ID of the page 600. The correspondence relation between a page 600 and an object 310 is specified based on the allocation rule table 116 and the external management table 130. DB data may be a set of records in a DB. Data stored in each data page 600c is accumulated in the DB buffer 112 and the accumulated data is written to the cache device 160 as DB data, but data as the segment management information and the page management information may be stored in the area of the DB buffer 112 or an area (area in the memory 102) different from the DB buffer 112 and may be written to the cache device 160 from the area.

Figure 3:
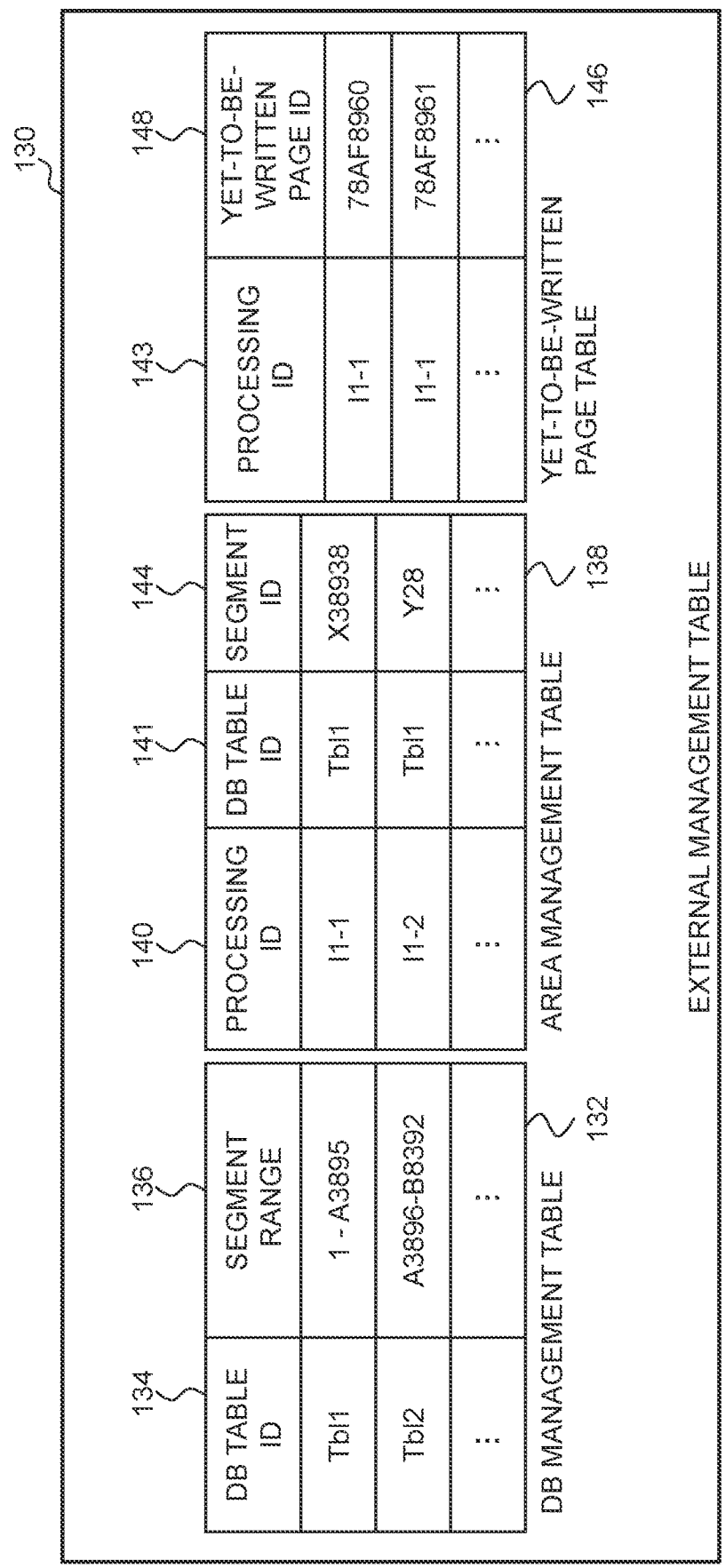
FIG. 3 illustrates the configuration of an external management table.

FIG. 3 illustrates the configuration of the external management table 130.

The external management table 130 indicates the relation between an element in the DB and an object in the external storage 300. Each element in the DB is, for example, a DB table (table in the DB) for simplification of description, but another element such as an index may be employed.

The external management table 130 includes a DB management table 132, an area management table 138, and a yet-to-be-written page table 146.

The DB management table 132 indicates the correspondence relation between a DB table and a segment. The DB management table 132 includes an entry for each DB table. Each entry includes information such as a DB table ID 134 and a segment range 136.

The DB table ID 134 indicates the ID of a DB table. The segment range 136 indicates the range (the ID of a leading segment and the ID of an end segment) of one or more segments in which the DB table is stored.

The area management table 138 indicates the correspondence relation between data insertion and update processing (processing performed in accordance with a DB operation request for, for example, Update, Delete, Insert, or Import) on the DB and a segment. The area management table 138 includes an entry for each DB processing. Each entry includes information such as a processing ID 140, a DB table ID 141, and a segment ID 144.

The processing ID 140 indicates the ID of DB processing. The DB table ID 141 indicates the ID of a DB table to and from which data is input and output through the DB processing. The segment ID 144 indicates the ID of a segment to and from which data is input and output through the DB processing.

The yet-to-be-written page table 146 indicates the correspondence relation between DB processing and a yet-to-be-written page. The "yet-to-be-written page" is a page in which data yet to be written to the external storage 300 is stored. The yet-to-be-written page table 146 includes an entry for each yet-to-be-written page. Each entry includes information such as a processing ID 143 and a yet-to-be-written page ID 148.

The processing ID 143 indicates the ID of DB processing. The yet-to-be-written page ID 148 indicates the ID of a page in which data is yet to be written to the external storage 300 among pages in which data is inserted and updated through data insertion and update processing on the DB.

The segment ID and the page ID may be each produced by synthesizing the device ID (typically, the serial number) of a block device virtually assumed for ID generation with the leading LBA of a segment or a page. The ID (for example, object name) of the object 310 and the storage position (offset) of the object 310 may be produced based on values as the segment ID and the page ID. The ID of a segment including a page 600 may be specified through calculation based on the page ID of the page 600. The ID of a page 600 included in a segment may be specified through calculation based on the ID of the segment.

FIG. 4 illustrates the configuration of the buffer management table 114.

The buffer management table 114 indicates the correspondence relation between a buffer area (area in the DB buffer 112) and a page 600. The buffer management table 114 includes an entry for each buffer area. Each entry includes information such as a buffer area ID 172, a page ID 174, and a state 176.

The buffer area ID 172 indicates the ID of a buffer area. The ID of a buffer area may include the ID of DB processing through which data is input to and output from the buffer area. The page ID 174 indicates the ID of a page 600 to and from which data input to and output from the buffer area is input and output. The state 176 indicates whether data in the buffer area is already reflected (copied) to the cache device 160. The term "clean" means that data in the buffer area is already reflected to the cache device 160. The term "dirty" means that data in the buffer area is yet to be reflected to the cache device 160.

FIG. 5 illustrates the configuration of the cache management table 124.

The cache management table 124 indicates the correspondence relation between an LBA and a page 600. The cache management table 124 includes an entry for each page 600. Each entry includes information such as an LBA 178, a page ID 179, and a write state 182.

The LBA 178 indicates the leading LBA of the page 600. The page ID 179 indicates the ID of the page 600. The write state 182 indicates whether all data in the page 600 is already written to the external storage 300.

FIG. 6 illustrates the configuration of the allocation rule table 116.

The allocation rule table 116 indicates the relation among a page, a segment, a segment group, and an object 310. The allocation rule table 116 includes information such as a page size 184, a segment size 186, a segment group size 188, and an object basic size 192.

The page size 184 indicates the size of a page 600. The segment size 186 indicates the size of a segment (specifically, the number of pages 600 included in the segment). The segment group size 188 indicates the size of a segment group (specifically, the number of segments included in the segment group). The object basic size 192 indicates the basic size of each object 310.

In the present embodiment, the basic size of each object 310 is the size of the object 310 as a set of segments not including the segment management page 600a. In the example illustrated in FIG. 6, the basic size of each object 310 is the size of four segments not including the segment management page 600a. For example, when an object 310 includes one segment including the segment management page 600a, the size of the object 310 is the sum of the basic size of each object 310 and the size of the segment management page 600a. In this case, in accordance with the rule exemplarily illustrated in FIG. 2, the page ID of the segment management page 600a and an object 310 including the page may be specified through calculation based on information stored in the allocation rule table 116.

The following describes exemplary processing performed in the present embodiment.

Figure 7:
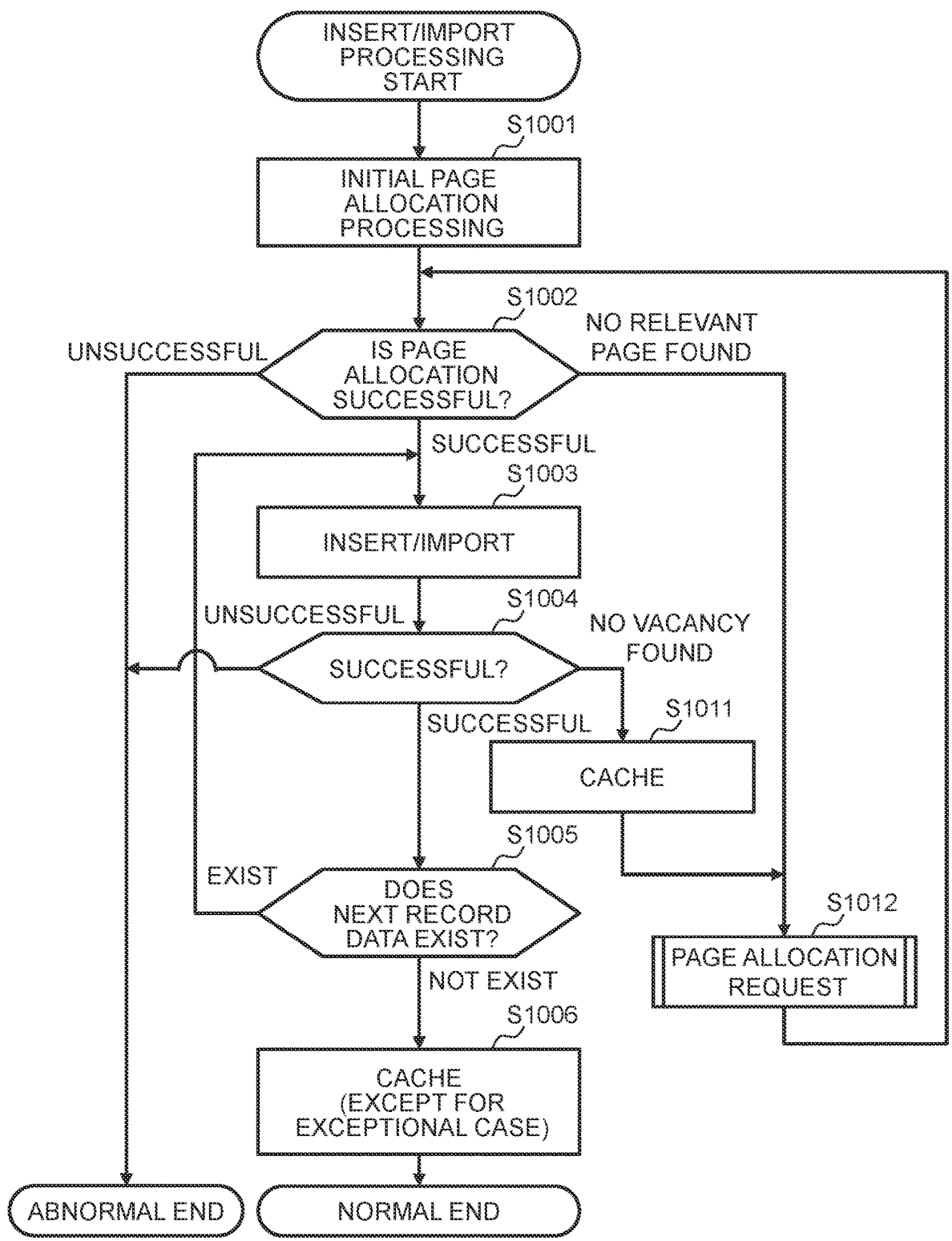
FIG. 7 illustrates the process of Insert/Import processing.

FIG. 7 illustrates the process of Insert/Import processing.

The Insert/Import processing is performed in response to a DB operation request by the DBMS 110 when a request for Insert or Import is received as the DB operation request by the DBMS 110.

The area management unit 122 performs initial page allocation processing (S1001). The initial page allocation processing is processing of allocating a first data page 600c to which Insert or Import target data is written. The "first data page 600c" is allocated by calculating a plurality of data pages 600c specified based on the allocation rule table 116, for example, a plurality of page IDs of the segment management information based on the allocation rule table 116 and referring to the data pages 600c to find a segment including a vacant page. The page management information of the found segment is referred to specify a data page 600c based on the page ID of a vacancy. In this case, the page ID of the segment management information of a segment for which page allocation is performed right before may be stored and preferentially used.

When the page allocation at S1001 is unsuccessful (S1002: unsuccessful), the processing abnormally ends. When no relevant page is found at S1001 (S1002: no relevant page found), page allocation request processing is performed (S1012).

When a relevant page is found at S1001 (S1002: successful), the DB processing unit 120 performs Insert or Import of a record of data in a buffer area corresponding to an allocation page (relevant page) (S1003). When the processing at S1003 is unsuccessful (S1004: unsuccessful), the processing abnormally ends.

When there is no vacancy for a record in the buffer area (allocation page) at S1003 (S1004: no vacancy), the DB processing unit 120 writes all data (DB data) in the buffer area to an allocation page based on the cache device 160 (S1011). Thereafter, the page allocation request processing is performed (S1012).

When there is no vacancy for a record in the buffer area (allocation page) at S1003 (S1004: no vacancy), the DB processing unit 120 determines next record data exists (S1005). For example, when the DB operation request is an Insert request and the insertion destination of next Insert target data is the same DB table, the result of the determination at S1005 may be true (existence). When the insertion destination of next Insert target data is a different DB table or the DB operation request is not an Insert request, the result of the determination at S1005 may be false (non-existence).

When the result of the determination at S1005 is true (S1005: existence), the processing returns to S1003.

When the result of the determination at S1005 is false (S1005: non-existence), the DB processing unit 120 writes all data (DB data) in the buffer area to an allocation page based on the cache device 160 except for an exceptional case (specifically, a case in which the DB operation request is an Insert request and Commit is not issued) (S1006). Thereafter, the processing normally ends.

When page allocation is performed at S1001 and S1012, the area management unit 122 reserves, in the DB buffer 112, a buffer area corresponding to the page allocation (adds an entry corresponding to the buffer area to the buffer management table 114).

Processes described below may be employed at S1011 and S1006.

The area management unit 122 updates, to "clean", the state 176 (the state 176 in the buffer management table 114) corresponding to a buffer area in which cache target data is stored, and also registers, to the yet-to-be-written page table 146, the ID of an allocation page as the yet-to-be-written page ID 148 corresponding to the processing ID of the Insert/Import processing.

The allocation page may be a data page the page ID 179 of which in the cache management table 124 is an invalid value or may be a data page the write state 182 of which in the cache management table 124 is "completed".

Figure 8:
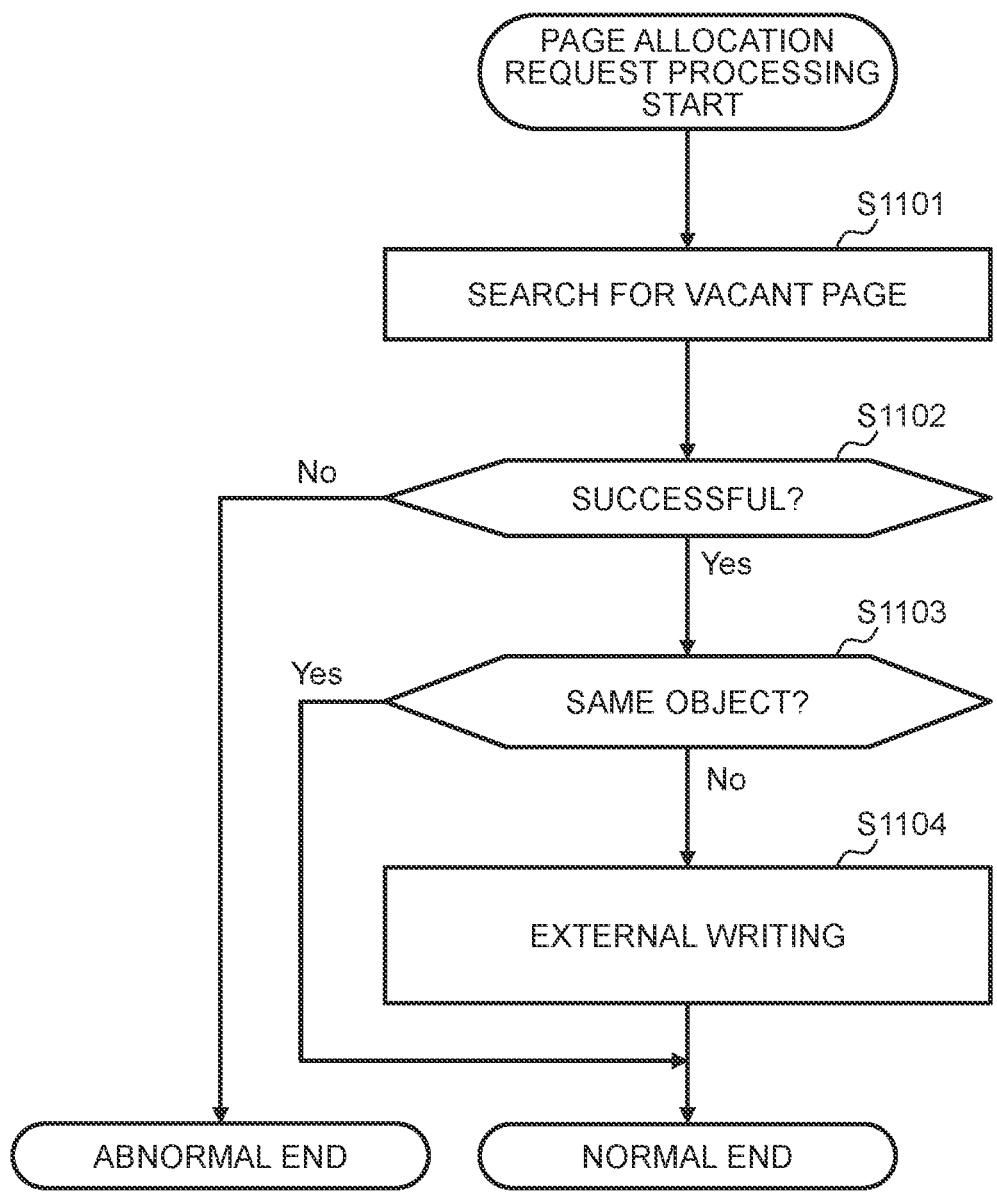
FIG. 8 illustrates the process of page allocation request processing.

FIG. 8 illustrates the process of the page allocation request processing (S1012 in FIG. 7).

The area management unit 122 searches for a vacant page for allocation (S1101). Specifically, processes described below may be performed, for example.

(S1101-1) The area management unit 122 specifies a segment including a previously allocated page based on the segment ID 144 in the area management table 138. The area management unit 122 refers to the page management information for the specified segment and searches for a vacant page in the segment.

(S1101-2) When no vacant page is found at S1101-1, the area management unit 122 refers to the segment management information for a segment group including the segment specified at S1101-1 and searches for a segment including a vacant page, for example, in one direction. The "search in one direction" means that search is performed in a direction in which the value of the segment ID increases and returned to the leading segment ID (the segment ID as a minimum value) when no vacant page is found although the value of the segment ID reaches a maximum value.

(S1101-3) When a segment including a vacant page is found at S1101-2, the area management unit 122 sets, as an allocation page, a vacant page in the found segment.

When no vacant page is found at S1101 (S1102: No), the processing abnormally ends.

When a vacant page is found at S1101 (S1102: Yes), the area management unit 122 determines whether data in the found vacant page is included in the same object 310 as data in the previous allocation page (S1103). This determination may be, for example, determination of whether the ID of an object specified through calculation using the page ID of the previous allocation page matches the ID of an object specified through calculation using the page ID of the found vacant page.

When the result of the determination at S1103 is true (S1103: Yes), the processing normally ends.

When the result of the determination at S1103 is false (S1103: No), external writing is performed (S1104). Specifically, the area management unit 122 writes, to the external storage 300, an object 310 including data in any page corresponding to a yet-to-be-written page ID 148 with which the same object is specified. Thereafter, the processing normally ends. Details of S1104 are as follows, for example.

Data in the existing object 310 may be used for data in a page not registered as the yet-to-be-written page ID 148. For example, when a newly written object 310 includes both data in a page registered as the yet-to-be-written page ID 148 and data in a page not registered as the yet-to-be-written page ID 148, the latter data may be data acquired from the existing object 310.

When the buffer management table 114 includes an entry including the page ID 174 matching the yet-to-be-written page ID 148 and the state "dirty", data in a buffer area may be included in an object 310. In this case, a page in the state "dirty" may be simultaneously written to the cache device 160.

When the buffer management table 114 includes an entry including the page ID 174 matching the yet-to-be-written page ID 148 and the state "clean", the area management unit 122 may specify the page ID 179 matching the page ID 174 in the cache management table 124. Data in the buffer area may be included in an object 310.

After the above-described writing of an object 310 is completed, the area management unit 122 may update the write state 182 to "completed" when the write state 182 corresponding to the page ID 179 is "not completed".

The area management unit 122 may update the page management information and write an object 310 including the updated page management information to the external storage 300. The area management unit 122 may update the segment management information and write an object 310 including the updated segment management information to the external storage 300.

Figure 9:
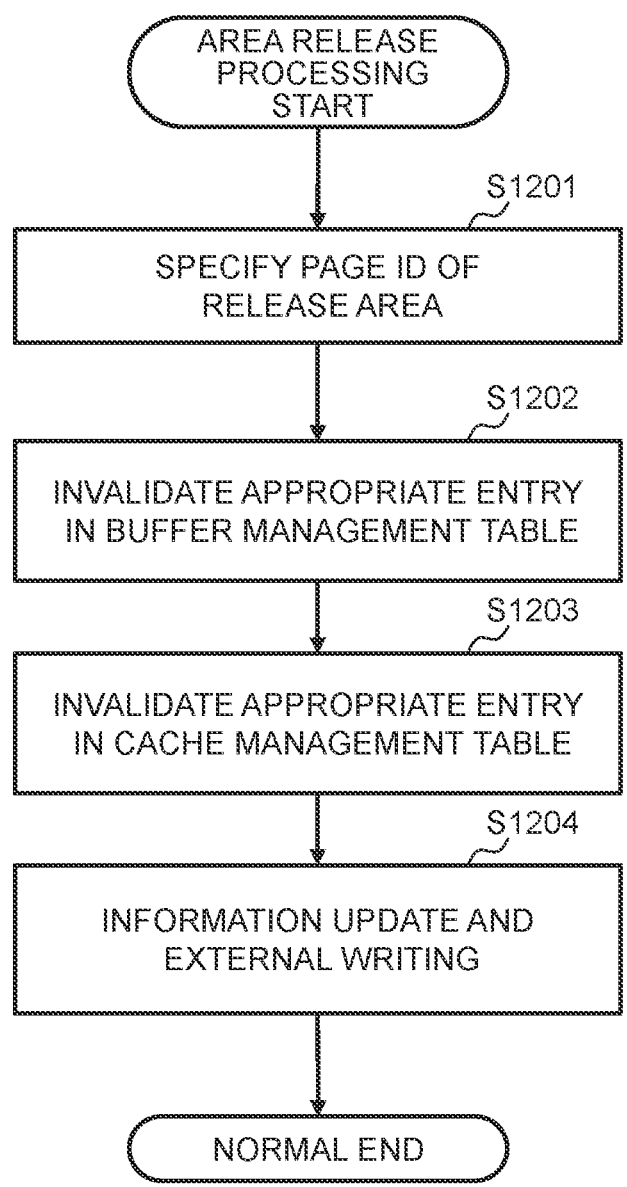
FIG. 9 illustrates the process of area release processing.

FIG. 9 illustrates the process of area release processing.

For example, the area release processing may be performed in response to a request for Delete of a DB table. The present processing may be performed when an area release request is received.

The area management unit 122 specifies the page IDs of any page as a release area (S1201). For example, the page IDs of any page as a release area are specified based on the segment range 136 corresponding to a Delete target DB table. When an area release request is received, any data page 600c included in a range designated by the request may be referred, whether all data in the page satisfies a condition based on the area release request may be checked, and the page ID of the page may be specified as a release target when the condition is satisfied.

The area management unit 122 invalidates, in the buffer management table 114, an entry including the page ID 174 matching the page ID specified at S1201 (S1202).

The area management unit 122 invalidates, in the cache management table 124, an entry including the page ID 174 matching the page ID specified at S1201 (S1203).

The area management unit 122 performs information update and external writing (S1204). Specifically, the area management unit 122 updates, in the page management information for a segment including the page specified at S1201, information related to the page to information indicating that the page is vacant. The area management unit 122 also updates, in the segment management information for a segment group including the page specified at S1201, information related to the segment including the page to information indicating that the segment includes the vacant page. The area management unit 122 writes, to the external storage 300, an object 310 including the segment for which the page management information is updated and an object 310 including the segment group for which the segment management information is updated. These objects 310 may be the same object.

In the area release processing, what is called read modify write may be performed in the unit of an object 310 or a page unit. Specifically, the update target page management information (update target segment management information) for the segment (segment group) including the page specified at S1201 may be read from the external storage 300 by the DB processing unit 120, the management information may be updated by the area management unit 122, and the updated management information may be included in an appropriate object 310 in the external storage 300 by the DB processing unit 120. In this manner, the page specified at S1201 is set to be vacant through update of the page management information and the segment management information.

Figure 10:
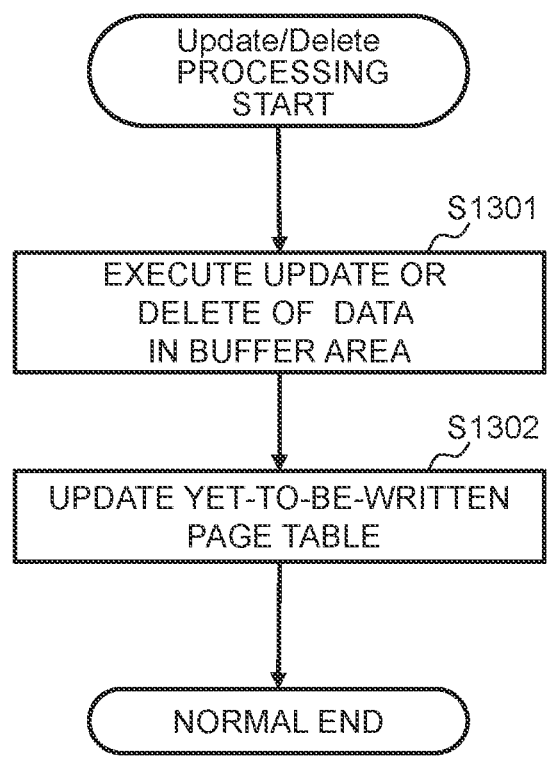
FIG. 10 illustrates the process of Update/Delete processing.

FIG. 10 illustrates the process of Update/Delete processing.

The Update/Delete processing is performed in response to a DB operation request by the DBMS 110 when a request for Update or Delete is received as the DB operation request by the DBMS 110.

The DB processing unit 120 performs Update or Delete of data in a buffer area corresponding to the Update/Delete processing (S1301). For example, when the cache management table 124 includes an entry corresponding to the buffer area, the DB processing unit 120 may read, to the buffer area, DB data from a page corresponding to the entry and perform Update or Delete of the data in the buffer area. For example, when the cache management table 124 includes no entry corresponding to the buffer area, the DB processing unit 120 may read, from an object 310 (object 310 in the external storage 300) including DB data in a page corresponding to the buffer area, the DB data to the buffer area and perform Update or Delete of the data in the buffer area.

The area management unit 122 updates the yet-to-be-written page table as necessary (S1302). For example, when the buffer area in which Update or Delete of data is performed at S1301 is a newly reserved buffer area, an entry including, as a yet-to-be-written page ID 146, the ID of the page corresponding to the buffer area may be added to the yet-to-be-written page table 146.

Figure 11:
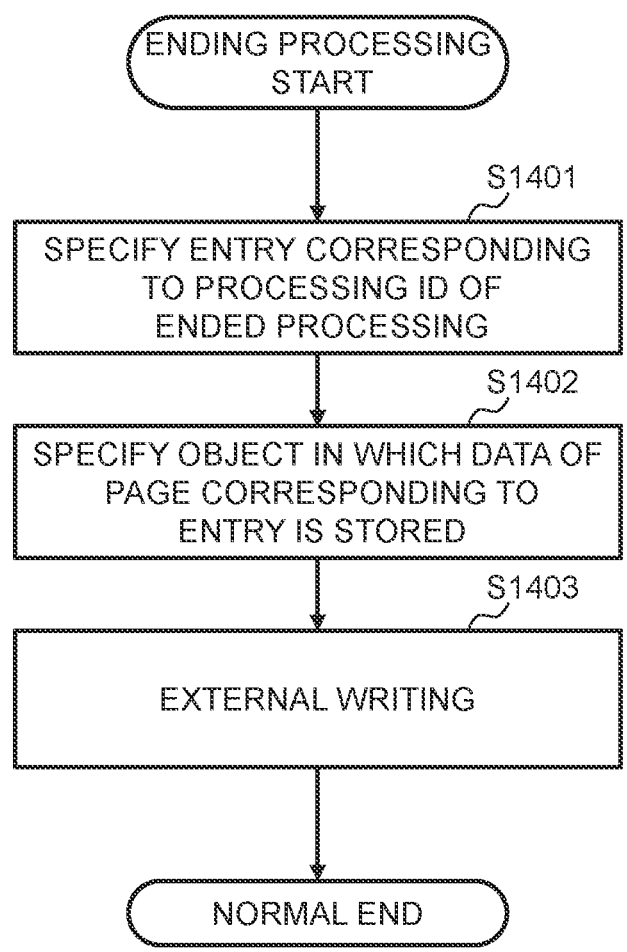
FIG. 11 illustrates the process of ending processing.

FIG. 11 illustrates the process of ending processing.

The ending processing is performed when Commit is issued or Import processing ends.

The area management unit 122 specifies an entry including the processing ID of ended processing (for example, an entry including the segment ID 144 and the yet-to-be-written page ID 148) in the external management table 130 (S1401).

The area management unit 122 specifies, based on the ID of a page indicated by the entry specified at S1401, an object 310 in which data in the page is stored (S1402).

The area management unit 122 writes, to the external storage 300, data in the page indicated by the entry specified at S1401 and management information (the page management information and the segment management information) related to the page (S1403). The writing at S1403 is performed in the unit of an object 310.

In the present embodiment, processes described below may be employed for writing to the external storage 300.

In a request for writing to the external storage 300 in an object unit, an update (write) target object may be associated with an object ID (object name). Accordingly, the external storage 300 performs writing (writing of the entire object 310) in accordance with the request.

In the request for writing to the external storage 300 in an object unit, update target data, an object ID (object name), and an offset from the start of the object 310 may be associated with one another for each update (write) target data (DB data, the page management information, or the segment management information) in the object 310. Accordingly, the external storage 300 performs writing (partial update (update in a data unit) in the object 310) in accordance with the request. When partial writing of the object 310 is not allowed, processing of reading the object 310, replacing update target data, and writing back the object 310 is performed.

In the present embodiment, processes described below may be employed for reading from the external storage 300.

In a request for reading from the external storage 300 in an object unit, the object ID (object name) of a read target object may be associated. Accordingly, the external storage 300 performs reading (reading of the entire object 310) in accordance with the request.

In the request for reading from the external storage 300 in an object unit, an object ID (object name) and an offset from the start of the object 310 may be associated with each other for each read target data in the object 310. Accordingly, the external storage 300 performs reading (partial reading (reading in a data unit) from the object 310) in accordance with the request.

The first embodiment is described so far. When a DB operation request that designates a DB table is received by the DBMS 110 of any server 100, the DB table ID of the designated DB table may be notified to another server 100. When external writing is performed by the DBMS 110 of any server 100 (when an object 310 is newly written or when any object 310 in the external storage 300 is updated), the object ID of the written (newly written or updated) object 310 may be notified to another server 100.

Second Embodiment

The following describes a second embodiment. The description will be mainly made on differences from the first embodiment, and description of features common to the first embodiment will be omitted or simplified.

Figure 12:
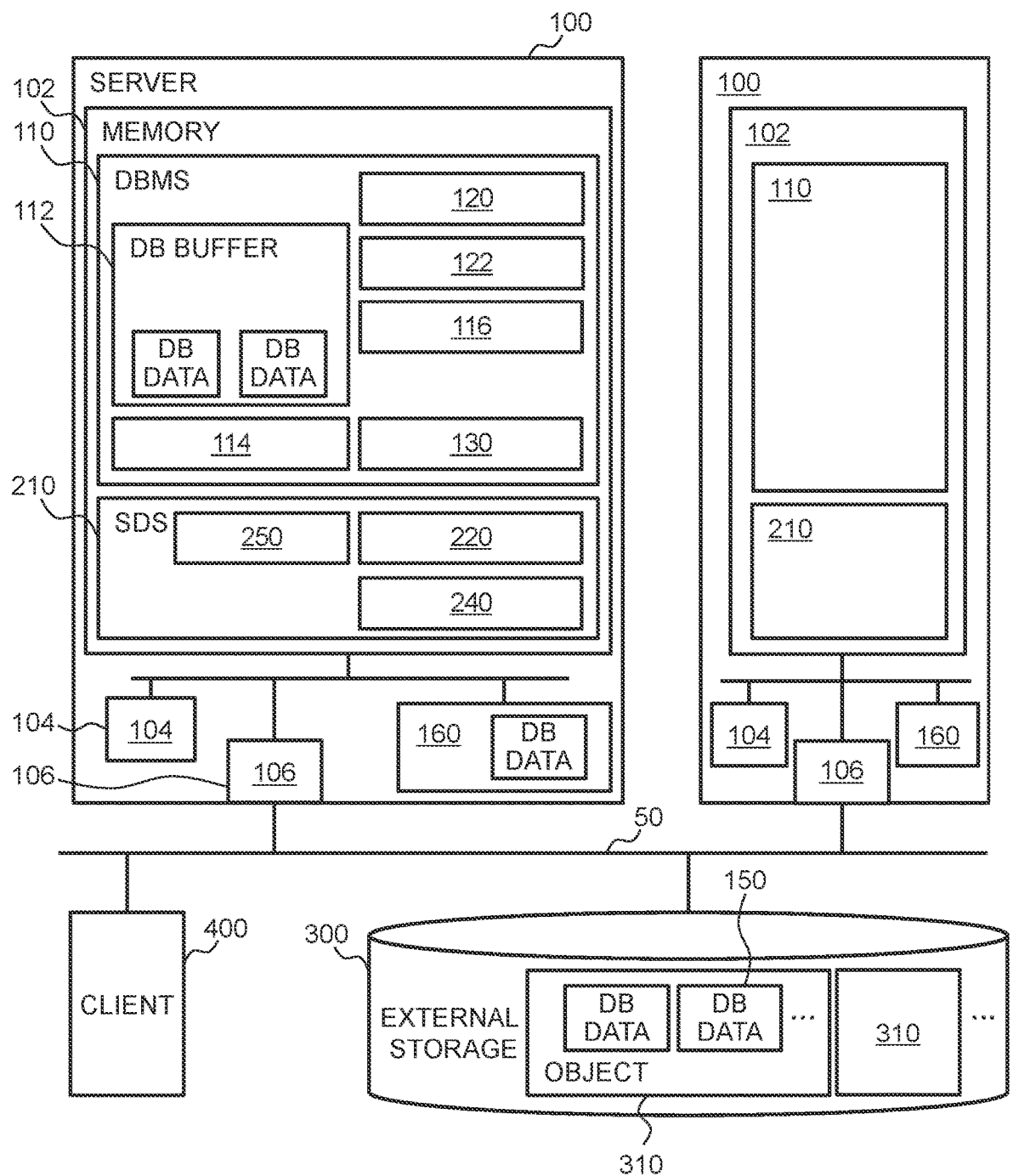
FIG. 12 illustrates the entire configuration of a system including a storage control system according to a second embodiment.

FIG. 12 illustrates the entire configuration of a system including a storage control system according to the second embodiment.

The DBMS 110 may include no cache management table 124. The external management table 130 may include no yet-to-be-written page table 146. Thus, S1302 in FIG. 10 may be omitted. The ending processing in FIG. 11 may be performed for the entire data of a processing target DB table. A processing target area may be specified based on the DB management table 132 in the external management table 130.

Each server 100 includes a software defined storage (SDS) 210 in addition to the DBMS 110. Specifically, the SDS 210 is implemented on the server 100 by the processor 104 executing a software program for implementing the SDS 210.

The SDS 210 manages a DB map table 250 and a storage management table 240. The SDS 210 includes a storage management unit 220.

The storage management unit 220 of the SDS 210 provides a logical device to the DBMS 110. The logical device is a logical storage device and is, for example, a logical cache device based on the cache device 160. A storage space of the logical device may be the continuous LBA space exemplarily illustrated in FIG. 2.

The DB processing unit 120 of the DBMS 110 inputs and outputs data to and from the logical device provided by the SDS 210. The storage management unit 220 of the SDS 210 inputs and outputs, to and from the cache device 160, the data input to and output from the logical device (the storage management unit 220 of the SDS 210 inputs and outputs the data to and from the external storage 300). For example, when data is written from the DBMS 110 to the logical device, the storage management unit 220 of the SDS 210 first writes the data to the cache device 160. Then, when the storage management unit 220 of the SDS 210 is instructed to perform writing to the external storage 300 by the area management unit 122 of the DBMS 110, the storage management unit 220 of the SDS 210 writes the data in the cache device 160 to the external storage 300. More specifically, processes described below are employed.

At S1006 and S1011 in FIG. 7, the DBMS 110 performs writing to the logical device. Before the writing, data as related management information (the page management information or the segment management information related to an updated page) is written to the logical device.

At S1104 in FIG. 8, S1204 in FIG. 9, and S1403 in FIG. 11, the DBMS 110 instructs the SDS 210 to perform writing to the external storage 300, and the SDS 210 performs writing to the external storage 300 in response to the instruction.

The SDS 210 may hold no allocation rule table 116 that is information related to area mapping by the DBMS 110. In this case, the storage management table 240 holds entries without changing the unit of writing from the DBMS 110 to the logical device. Specifically, mapping is performed without dividing the unit of writing from the DBMS 110, and writing to the external storage 300 is performed without dividing the unit of writing from the DBMS 110.

The DBMS 110 performs mutual conversion between a page ID and a segment ID, and a logical device ID and an address (LBA) in the logical device.

FIG. 13 illustrates the configuration of the storage management table 240.

The storage management table 240 indicates the relation among the address of the logical device, the address of the cache device 160, and a storage position in the external storage 300. The storage management table 240 includes an entry for each unit of writing from the DBMS 110 to the logical device. Each entry includes information such as a logical address 242, a cache address 244, an external storage position 246, and a state 248.

The logical address 242 indicates the address range of the logical device. The logical address 242 is expressed by, for example, a combination of the ID and the LBA range of the logical device.

The cache address 244 indicates the address range of the cache device 160. The cache address 244 is expressed by, for example, a combination of the ID and the LBA range of the cache device 160.

The external storage position 246 indicates the storage position in the external storage 300. The external storage position 246 is expressed by, for example, a combination of an object ID (object name) and an offset from the start of an object.

The state 248 indicates which storage device data written in the corresponding writing unit exists in. "Both" means that the data exists in both the cache device 160 and the external storage 300. "Str only" means that the data does not exist in the cache device 160 but exists in the external storage 300.

FIG. 14 illustrates the configuration of the DB map table 250.

The DB map table 250 indicates the correspondence relation among a DB table, a segment, and the logical device address. The DB map table 250 includes an entry for each DB table. Each entry includes information such as a DB table ID 334, a segment range 336, and a logical address 342.

The DB table ID 334 indicates the ID of the DB table. The segment range 336 indicates the range (the ID of a leading segment and the ID of a last segment) of one or more segments in which the DB table is stored. The logical address 342 indicates the address range of the logical device.

Figure 15:
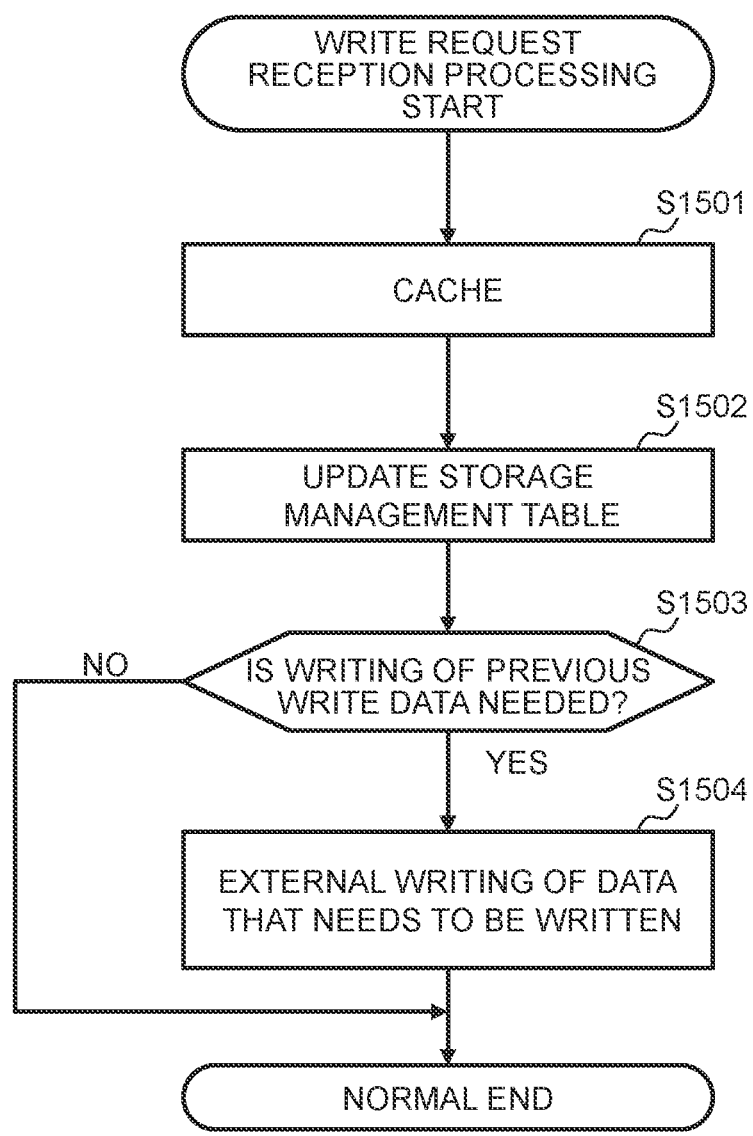
FIG. 15 illustrates the process of write request reception processing.

FIG. 15 illustrates the process of write request reception processing.

The write request reception processing is performed by the storage management unit 220 of the SDS 210. The write request reception processing is performed in response to an external write request from the DBMS 110. The external write request is issued by the DBMS 110 at S1403 of the ending processing (refer to FIG. 11) by the DBMS 110. In other words, at S1403 in the second embodiment, issuing of the external write request is performed in place of external writing execution.

The storage management unit 220 performs writing to the cache device 160 (S1501). Data thus written is data (DB data and related management information) designated by the DBMS 110.

The storage management unit 220 updates the storage management table 240 (S1502). Specifically, the storage management unit 220 adds, to the storage management table 240, an entry corresponding to the unit of writing at S1501. The value of the state 248 in the added entry may be a value meaning that the data exists in the cache device 160 but does not exist in the external storage 300.

The storage management unit 220 determines whether external writing of previous write data (data written at S1501 of the previous write request reception processing) is needed (S1503). Specifically, for example, the storage management unit 220 specifies any entry indicating a logical address within a certain distance in a direction toward smaller addresses from a logical address indicated by the entry added at S1502. The storage management unit 220 determines whether the specified entries include an entry including the state 248 indicating that data exists in the cache device 160 but does not exist in the external storage 300. The result of the determination at S1503 is true (in other words, it is determined that external writing is needed) when the result of the determination is true, or the result of the determination at S1503 is false (in other words, it is determined that external writing is unnecessary) when the result of the determination is false. When the result of the determination at S1503 is false (S1503: No), the processing normally ends without performing S1504.

When the result of the determination at S1503 is true (S1503: Yes), the storage management unit 220 performs external writing of data at a place indicated by the cache address 244 in a writing-necessary entry (entry in the storage management table 240) (S1504). The external writing is performed in accordance with a writing unit indicated by the entry.

The second embodiment is described so far.

Third Embodiment

The following describes a third embodiment. The description will be mainly made on differences from the first and second embodiments, and description of features common to the first and second embodiments will be omitted or simplified.

Figure 16:
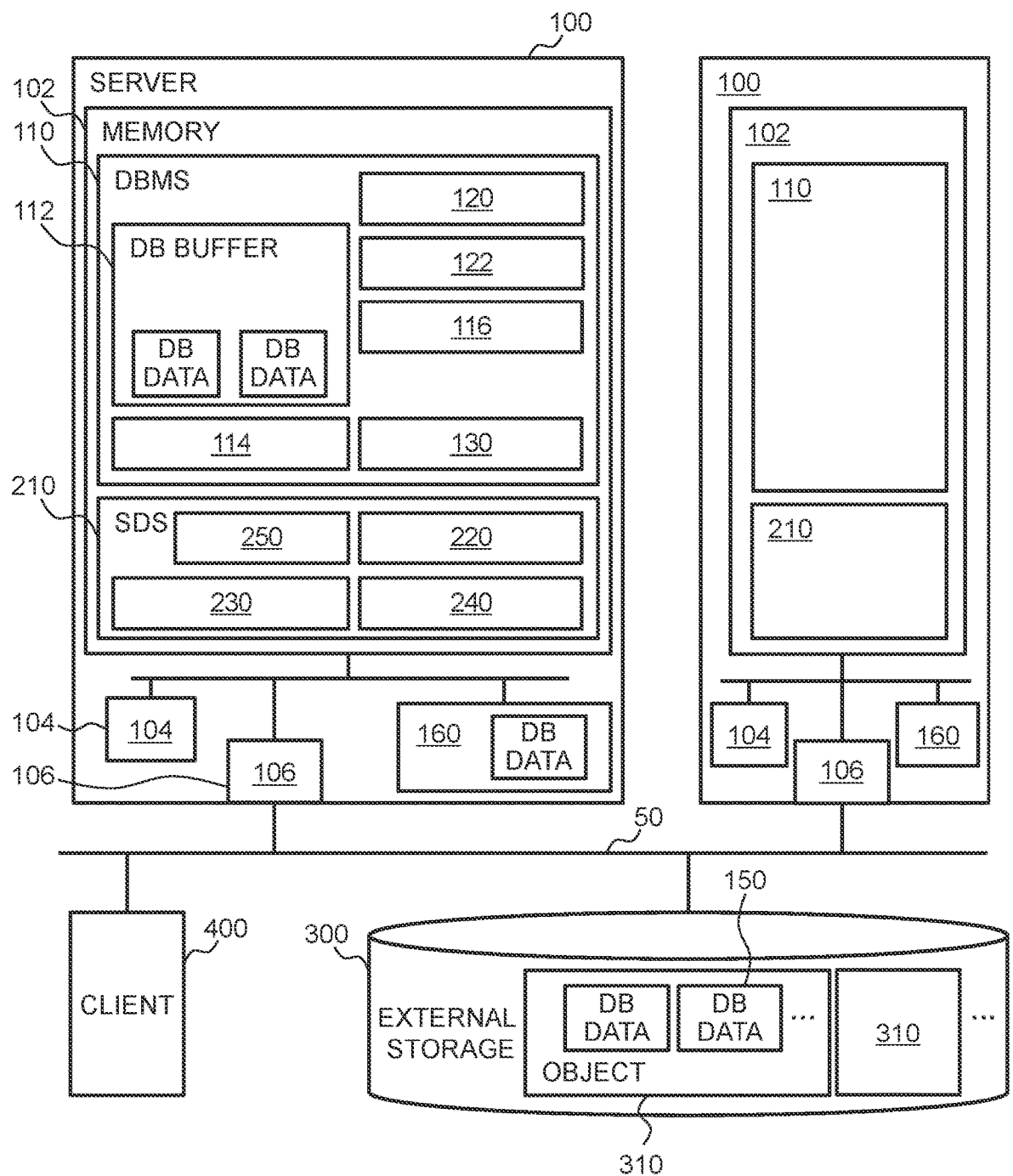
FIG. 16 illustrates the entire configuration of a system including a storage control system according to a third embodiment.

FIG. 16 illustrates the entire configuration of a system including a storage control system according to the third embodiment.

The SDS 210 manages an external writing rule table 230 that indicates an execution timing of external writing. The storage management unit 220 of the SDS 210 determines the timing of external writing based on the external writing rule table 230.

When the ending processing (refer to FIG. 11) is performed by the DBMS 110, the storage management unit 220 receives an external write request from the DBMS 110 and performs the processing illustrated in FIG. 15 in response to the request.

The third embodiment is described so far.

Description of the first to third embodiments is summarized below. The summary may include supplemental description of the above description and may include description of modifications.

Each server 100 is an exemplary storage control apparatus. The server 100 is coupled to the external storage 300, includes the processor 104 and the cache device 160, and updates a database.

The database is stored in a plurality of pages 600 (a plurality of logical storage areas) constituting a logical storage space. Data writing to the database in the logical storage space is performed in a page unit. The processor 104 writes data to the cache device 160 in a page unit. The processor 104 determines whether an execution condition on external writing (writing to the external storage 300) is satisfied. When the result of the determination is true, the processor 104 writes data stored in the cache device 160 to the external storage 300 in an object unit. The object unit is an exemplary bulk unit that is larger than a page unit and is a writing unit in which consistency is maintained, and an object unit of data is an object 310.

In this manner, database data is stored in the external storage 300. Low-overhead writing while consistency is maintained, in other words, writing optimization with both performance and cost maintained is expected in an environment in which performance and cost differ based on the number of times of writing from the server 100 to the external storage 300 and a database is stored in the external storage 300.

The processor 104 may write the page management information for each segment including a plurality of data pages 600c. For each segment, data page 600c is a page in which DB data is stored, and the page management information is management information indicating which data page of the segment is vacant. In the above-described embodiments, the page management information may be written to a page management page 600b reserved for each segment among the plurality of pages 600. The processor 104 includes, in addition to DB data in a data page 600c, the page management information for a segment including the data page, in an object 310 written to the external storage 300. In each object 310, the page management information may include, for each data page 600c in a segment corresponding to the page management information, the page ID of the data page 600c, and may include, for each data page 600c, the position (offset from the object 310) of DB data in the data page 600c or information indicating whether the data page 600c is vacant. Each object 310 may include DB data in all data pages 600c in a segment corresponding to the page management information, or may include DB data in some data pages 600c in the segment corresponding to the page management information and the page management information may indicate that some data pages 600c are vacant.

The logical storage space in which a database is stored is a continuous address space, and data in the continuous address space needs to be divided into a plurality of objects 310 when stored in the external storage 300. Since the page management information in addition to DB data is stored in each object 310, the DB data can be specified based on the page management information in the object 310. Moreover, since the object 310 is stored in the external storage 300 while consistency between the page management information and the DB data is maintained, low-overhead writing is expected while consistency is maintained. Each segment may have a fixed size or a variable size (the segment size may be uniform or ununiform).

The processor 104 may write the segment management information for each segment group including a plurality of segments. The segment management information for each segment group may be management information indicating which segment of the segment group includes a vacant data page. The processor 104 may include, in addition to DB data in a data page 600c and the page management information for a segment including the data page 600c, the segment management information for a segment group including the segment if the segment management information is associated with the segment, in an object 310 written to the external storage 300. In each object 310, the segment management information may include, for each segment in a segment group corresponding to the segment management information, the ID of the segment. The segment ID may be obtained through calculation based on the page ID, and the ID of the object 310 may be obtained through calculation based on the page ID or the segment ID.

A segment including a vacant page can be specified based on the segment management information, and the vacant page can be specified based on the page management information of the specified segment. Accordingly, the vacant page can be swiftly specified. The "vacant page" means a page to which data can be newly written.

In the above-described embodiments, the segment management information may be written to a segment management page 600a reserved for each segment group among a plurality of pages 600. In other words, each segment group may be constituted by a maximum number of segments that can be managed by information that can be stored in one page 600. Accordingly, a vacant page can be swiftly specified without changing a writing unit that is a page unit.

The execution condition on external writing may be release of any data page 600c. When any data page 600c is released, the processor 104 may update the page management information for a segment including the released data page 600c and write an object 310 including the updated page management information to the external storage 300. In the object, no DB data exists for the released data page 600c, and the updated page management information manages the data page 600c as a vacant page. In this manner, it is possible to update the page management information of the object 310 at the timing of release of the data page 600c and perform external writing (update) of the object 310 including the updated page management information.

The processor 104 may perform write processing (for example, Insert/Import processing) that is processing of data writing to the database in response to a write request. In the write processing, the processor 104 may determine whether an object 310 to which a data page 600c at a data write destination belongs is the same as an object 310 to which another data page 600c at a previous data write destination belongs. The execution condition on external writing may be such that the result of the determination is false.

In the write processing, when the write destination is shifted from the first data page 600c to the next second data page 600c while data is written to two or more data pages 600c at continuous addresses, an object 310 to which pre-shift data pages 600c including the first data page 600c belong is different from an object 310 to which the second data page 600c belongs, in some cases. In such a case, the object 310 to which the pre-shift data pages 600c including the first data page 600c belong is externally written. Accordingly, low-overhead writing is expected while consistency is maintained.

The execution condition on external writing may be end of the above-described write processing. When the write processing ends, the processor 104 may specify a yet-to-be-written data page 600c corresponding to the write processing, the yet-to-be-written data page 600c being a data page 600c corresponding to data written to the cache device 160 but yet to be written to the external storage 300. The processor 104 may write, to the external storage 300, an object 310 including data corresponding to the specified yet-to-be-written data page 600c and existing in the cache device 160. Accordingly, low-overhead writing is expected while consistency is maintained even when yet-to-be-written data (data yet to be written to the external storage 300) corresponding to the size of the object 310 is generated.

The processor 104 may execute a first software program for causing the processor 104 to function as the DBMS 110 for performing data writing to the database, and a second software program for causing the processor 104 to function as the SDS 210 for performing data writing to the cache device 160 and the external storage 300. The SDS 210 may provide the DBMS 110 with a logical device that is a logical storage space. The SDS 210 may receive, from the DBMS 110, a request for writing in a page unit to the logical device, and write data to the cache device 160 in response to the write request. The SDS 210 may determine whether the execution condition on external writing is satisfied. When the result of the determination is true, the SDS 210 may write data stored in the cache device 160 to the external storage 300 in an object unit. Accordingly, low-overhead writing is expected while consistency is maintained with less modification of the DBMS 110.

The execution condition on external writing may be existence of a logical address as follows:
Logical address within a certain distance in a direction toward smaller addresses from a current write destination logical address.

Logical address corresponding to data existing in the cache device 160 but not existing in the external storage 300.

The object 310 may be data including a plurality of DBMS writing units of data. A DBMS writing unit may be the unit of data writing from the DBMS 110 to the logical device. In this manner, the object 310 including a plurality of DBMS writing units of data is externally written while the DBMS writing unit (unit of writing from the DBMS 110 to the logical device) is maintained. Accordingly, low-overhead writing is expected while consistency is maintained.

The execution condition on external writing may be a condition indicated by information provided from the DBMS 110 to the SDS 210 or may be a condition indicated by information defined in the SDS 210 in advance. For example, the external writing rule table 230 (refer to FIG. 16) managed by the SDS 210 may be a table storing information received from the DBMS 110 or may be a table defined in advance. Accordingly, similarly to the DBMS 110 in the first embodiment, the SDS 210 can perform external writing at an appropriate timing.

The server 100 is an on-premise apparatus (physical calculator), the cache device 160 is a block device, and the external storage 300 is an object storage. Block access can be maintained at data writing inside the server 100 (data can be written to the cache device 160 in a page unit by block access), and thus writing optimization with both performance and cost maintained is expected with less modification of the server 100.

The above-described embodiments are examples for description of the present invention and are not intended to limit the scope of the present invention only to the embodiments. The present invention may be achieved in other various kinds of embodiments. For example, each server 100 may be a server (server instance as a cloud computing service) on a cloud such as a public cloud instead of an on-premise server. The storage control system may be constituted by one server 100. The external storage 300 may be a file storage instead of an object storage, and each object 310 may be a file. A file system may be established on the cache device 160, DB data 150 may be stored in a file, and a file name and an offset may be used in place of the cache LBA 178 in the cache management table 124.

What is claimed is:

1. A storage control apparatus coupled to an external storage, comprising:
a processor; and
a cache device,
wherein the processor is configured to update a database,
wherein the database is stored in a plurality of pages that are a plurality of logical storage areas constituting a logical storage space,
wherein data writing to the database in the logical storage space is performed in a unit of a page,
wherein the processor is configured to:
write data to the cache device in a page unit,
determine whether an execution condition of external writing that is writing to the external storage is satisfied, and
write, upon determining the execution condition is satisfied, data stored in the cache device to the external storage in an object unit that is larger than a page unit and is a writing unit in which consistency is maintained,
wherein the processor is configured to write page management information for each segment,
wherein each segment includes a plurality of data pages in which database data is stored and includes a page management page in which the page management information is stored, the page management information indicating which data page of the segment is vacant, and
wherein the object unit written to the external storage by the processor includes a plurality of continuous segments and each segment includes the data pages of the segment and the page management information page of the segment, which is continuous with respect to one of the data pages of the segment.

2. The storage control apparatus according to claim 1,
wherein the processor is configured to write segment management information for each segment group, each segment group including a plurality of segments,
wherein the segment management information for each segment group is management information indicating which segment of the segment group includes a vacant data page, and
wherein the object unit written to the external storage by the processor includes the segment management information for a segment group including the segment if the segment management information is associated with the segment.

3. The storage control apparatus according to claim 1,
wherein the execution condition is a release of any data page among the data pages, and
wherein when any data page is released, the processor updates the page management information for a segment including the released data page and writes the object unit of data including the updated page management information to the external storage.

4. The storage control apparatus according to claim 1,
wherein the processor performs write processing that is processing of data writing to the database in response to a write request,
wherein in the write processing, the processor determines whether an object unit of data to which a data page at a data write destination belongs is the same as another object unit of data to which another data page at a previous data write destination belongs.

5. The storage control apparatus according to claim 4,
wherein the execution condition is an end of the write processing, and
wherein when the write processing ends, the processor is configured to:
specify a yet-to-be-written data page corresponding to the write processing, the yet-to-be-written data page being data page corresponding to data written to the cache device but yet to be written to the external storage, and
writes, to the external storage, an object unit of data including data corresponding to the specified yet-to-be-written data page and that exists in the cache device.

6. The storage control apparatus according to claim 1,
wherein the processor is configured to execute:
a first software program for causing the processor to function as a database management system (DBMS) for performing data writing to the database, and
a second software program for causing the processor to function as a software defined storage (SDS) for performing data writing to the cache device and the external storage, and
wherein the SDS is configured to:
provide the DBMS with a logical device that is a logical storage space, receive, from the DBMS, a request for writing in a page unit to the logical device,
write data to the cache device in response to the write request,
determine whether the execution condition is satisfied, and
write, when a result of the determination is true, data stored in the cache device to the external storage in an object unit.

7. The storage control apparatus according to claim 6,
wherein the execution condition is an existence of a logical address as follows: a logical address within a certain distance in a direction toward smaller addresses from a current write destination logical address, or a logical address corresponding to data existing in the cache device but not existing in the external storage,
wherein the object unit of data is data including a plurality of DBMS writing units of data, and
wherein a DBMS writing unit is a unit of data writing from the DBMS to the logical device.

8. The storage control apparatus according to claim 6,
wherein the execution condition is a condition indicated by information provided from the DBMS to the SDS or is a condition indicated by information defined in the SDS in advance.

9. The storage control apparatus according to claim 1,
wherein the storage control apparatus is an on-premise apparatus,
wherein the cache device is a block device, and
wherein the external storage is an object storage or a file storage.

10. A storage control method performed by a storage control apparatus coupled to an external storage, including a cache device, and configured to update a database, the database being stored in a plurality of pages that are a plurality of logical storage areas constituting a logical storage space, the method comprising:
  writing data to the cache device in a page unit;
  writing data to the database in the logical storage space in a unit of page;
  determining whether an execution condition of external writing that is writing to the external storage is satisfied; and
  writing, upon determining the execution condition is satisfied, data stored in the cache device to the external storage in an object unit that is larger than a page unit and is a writing unit in which consistency is maintained;
  wherein the processor is configured to write page management information for each segment,
  wherein each segment includes a plurality of data pages in which database data is stored and includes a page management page in which the page management information is stored, the page management information indicating which data page of the segment is vacant, and
  wherein the object unit written to the external storage by the processor includes a plurality of continuous segments and each segment includes the data pages of the segment and the page management information page of the segment, which is continuous with respect to one of the data pages of the segment.

* * * * *